United States Patent Office 3,770,664
Patented Nov. 6, 1973

3,770,664
CATALYST AND PROCESS FOR POLYMERIZING EPOXY COMPOUND USING SAID CATALYST
Koji Chono and Toshiaki Matsuo, Kanagawa, Japan, assignors to Nippon Zeon Co., Ltd., Tokyo, Japan
No Drawing. Filed Dec. 29, 1971, Ser. No. 213,820
Claims priority, application Japan, Dec. 29, 1970, 46/121,602; Feb. 22, 1971, 46/8,014, 46/8,015, 46/8,016
Int. Cl. C08g 23/14
U.S. Cl. 260—2 A    30 Claims

ABSTRACT OF THE DISCLOSURE

A novel catalyst comprising a reaction product among an organoaluminum compound, a phosphorus compound having at least one P—OH linkage in the molecule, and a compound selected from thiuram compounds, benzothiazyl sulfenamides, dithiocarbamates, xanthogenates, salts of benzothiozole, and salts of benzoimidazole. An epoxy compound can be polymerized to a high-molecular-weight polymer in excellent yields using said catalyst.

---

This invention relates to a novel process for polymerizing an epoxy compound, and to a polymerization catalyst.

Catalysts composed mainly of organoaluminum compounds or organozinc compounds have previously been used for polymerizing epoxy compounds, but have been unable to give satisfactory polymers in high yields. It has also been known to use a reaction product between an organoaluminum compound and a pohsphorus compound having a P—OH linkage within the molecule as a polymerization catalyst for epoxy compounds (Japanese patent publication No. 5444/63). The catalyst, however, has not proved satisfactory in the molecular weight and yield of the polymer obtained.

It is an object of this invention to provide a process for polymerizing an epoxy compound to produce an epoxy polymer of high molecular weight in high yields. This object can be achieved by using as polymerization catalyst a reaction product among (A) an organoaluminum compound, (B) a pohsphorus compound having at least one P—OH bond within the molecule, and (C) a compound selected from the group consisting of thiuram compounds, benzothiazoyl sulfenamide, dithiocarbamic acid salts, xanthogenic acid salts, salts of benzothiazole, and salts of benzoimidazole.

The organoaluminum compound (A) is a compound expressed by the general formula $$AlR_nX_{3-n}$$

wherein R is an alkyl, alkenyl, cycloalkyl, aryl or aralkyl group, X is a hydrogen, fluorine, chlorine, bromine, or iodine atom, and $n$ is an integer of 1 to 3. Typical examples of the organoaluminum compound include triethyl aluminum, triisobutyl aluminum, tri-n-hexyl aluminum, diethyl aluminum bromide, diethyl aluminum chloride, ethylaluminum dichloride, diphenylaluminum chloride, or ethylaluminum sesquichloride. They also include a mixture of alkyl aluminums obtained by direct reaction of aluminum metal and alkyl halides, or a mixture of aluminum alkyl halides obtained by reaction of alkyl aluminums and aluminum halides.

As the phosphorus compound (B), there can be mentioned ortho-phosphoric acid, phosphorous acid, the diphosphorous acid, hypophosphorous acid, hypophosphoric acid, and condensed hosphoric acids, etc. The condensed phosphoric acids include polyphosphoric acids, or metaphosphoric acid. Examples of the polyphosphoric acids are pyrophosphoric acid, triphosphoric acid, trimetaphosphoric acid, and tetrametaphosphoric acid.

Examples of the thiuram compounds (C) include tetramethylthiuram monosulfide, tereamethylthiuram disulfide, tetraethylthiuram disulfide, tetrabutylthiuram disulfide, dimethyl diphenylthiuram tetrasulfide, tetramethylthiuram tetrasulfide, or dipentamethylenethiuram tetrasulfide.

The benzothiazyl sulfenamide is a compound whose skeleton is expressed by the formula

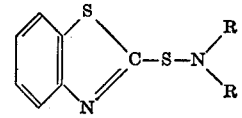

wherein R is a hydrogen atom or an organic group, and the two R's may form a ring with N. Typical examples include N,N-diethyl-2-benzothiazyl sulfenamide, N-cyclohexylbenzothiazyl sulfenamide, N-oxydiethylenebenzothiazoyl-2-sulfenamide, N-tert.-butyl-2-benzothiazyl sulfenamide, N,N-diisopropyl-2-benzothiazyl sulfenamide, and N,N-dicyclohexyl benzothiazyl sulfenamide.

The dithiocarbamic acid salts and the xanthogenic acid salts include amine salts such as piperidine or pipecoline salt, and dinitrophenyl ester in addition to salts of metals such as zinc, cadmium, copper, nickel, cobalt, manganese, iron, lead, tellurium, selenium or bismuth. Examples of the dithiocarbamic acid salts include zinc dimethyldithiocarbamate, zinc ethylphenyldithiocarbamate, cadmium diethyldithiocarbamate, zinc dibutyldithiocarbamate, selenium diethyldithiocarbamate, nickel dimethyldithiocarbamate, nickel dibutyldithiocarbamate, cobalt dimethyldithiocarbamate, manganese diethyldithiocarbamate, bismuth dimethyldithiocarbamate, tellurium diethyldithiocarbamate, copper dimethyldithiocarbamate, piperidine salt of pentamethylenedithiocarbamic acid, pipercoline salt of pentamethylenedithiocarbamate, and 2,4-dinitrophenyl dimethyldithiocarbamate. On the other hand, examples of the xanthogenic acids include zinc butylxanthogenate and zinc isopropylxanthogenate.

The salts of benzothiazole or benzimidazole include the metal salts such as copper or zinc salt, amine salts, nitrophenyl salts, etc. Specific examples of the benzothiazole salt are zinc salt of 2-mercaptobenzothiazole, copper salt of 2-mercaptobenzothiazole, cyclohexylamine salt of 2-mercaptobenzothiazole, 2 - (4 - morpholinyldithio)benzothiazole, 2-benzothiazyl-N,N-diethylthiocarbamoyl sulfide, 2-(2,6-dimethyl-4-morpholinothio)benzothiazole, and 2-(2,4-dinitrophenyl)mercaptobenzothiazole. Examples of the benzimidazole salt are zinc salt of 2-mercaptobenzimidazole, and copper salt of 2-mercaptobenzimidazole.

In the preparation of the novel catalyst of this invention, the proportion of the phosphorus compound (B) to be reacted is 0.01 to 10 mols, preferably 0.05 to 5 mols, per mol of the organoaluminum compound (A). The proportion of the compound (C) is 0.001 to 10 mols, preferably 0.01 to 5 mols per mol of the organoaluminum compound (A). The preparation of the catalyst can be performed for example in an atmosphere of an inert gas such as nitrogen gas, or in the presence or absence of an inert solvent. Examples of the inert solvent that is used for the preparation of the catalyst are hydrocarbons such as hexane, heptane, benzene, or toluene, ethers such as diethyl ether, or mixtures of these.

The sequence of reaction among the compounds (A), (B), and (C) may be such that first the compounds (A) and (B) are reacted, and then the reaction product is reacted with the compound (C); or the compounds (A) and (C) are reacted, and then the reaction product is reacted with the compound (B).

The catalyst can be prepared at a temperature of from −50° C. to 150° C., preferably from −20° C. to 100° C.

The catalyst so prepared can be directly used as a highly active polymerization catalyst for epoxy compounds. But its activity can be enhanced by aging for 10 minutes to 2 days at room temperature to 200° C., preferably for 10 minutes to 3 hours at 30° C. to 100° C.

In the polymerization of epoxy compounds, the catalyst is used ordinarily in an amount of 0.1 to 10 parts by weight per 100 parts by weight of the epoxy compounds.

By the way, a combination of (A), (B) and (C) must be employed to obtain industrially useful high polymers in high yield, since the activity is poor when (A) or (B) is not used than when (C) is not used and a little polymerization occurs, if there is any.

Examples of the epoxy compounds to be polymerized in accordance with the present invention include alkylene oxides such as ethylene oxide, propylene oxide, butylene oxide, isobutylene epoxide, or butadiene monoxide; substituted alkylene oxides such as epichlorohydrin, epibromohydrin, methacryl chloride epoxide, trifluoromethyl ethylene oxide, or dichloroisobutylene oxide; alicyclic epoxides such as cyclohexene oxide or vinyl cyclohexene oxide; glycidyl ethers such as allyl glycidyl ether, phenyl glycidyl ether, or chloroethyl glycidyl ether; and other epoxides such as glycidyl acrylate, styrene oxide, or epoxy stearate.

The polymerization of the epoxy compound in accordance with this invention can be performed over a wide temperature range, that is, from −20° C. to 200° C., but is usually performed at a temperature of 0° C. to 100° C. in the presence or absence of a solvent. As the solvent, there may be used, for example, ethers such as diethyl ether, dipropyl ether, or diisopropyl ether; aromatic hydrocarbons such as benzene or toluene; saturated aliphatic hydrocarbons or alicyclic hydrocarbons such as n-heptane or cyclohexane; halogenated aromatic hydrocarbons such as chlorobenzene; and haloalkanes such as methyl chloride, methylene chloride, chloroform, carbon tetrachloride, or ethylene dichloride.

The molecular weight of the resulting alkylene oxide polymer or copolymer is expressed by a reduced specific viscosity. The reduced specific viscosity means $\eta_{sp.}/c$ measured as to a solution in a diluent of the polymer or copolymer. Specifically, the polymer or copolymer is dissolved in cyclohexanone containing 0.5% of 2,2'-methylene-bis(4)-methyl-6-tert. butyl phenol) as an antioxidant to prepare a 0.1% solution of the polymer or copolymer which is then heated to 100° C. to form a complete solution and thereafter cooled to 50° C. The measurement of the reduced specific visicosity is made at 50° C.

The invention will now be described specifically with reference to the following Examples which are presented for illustrative, rather than limitative, purposes.

[USE OF THIURAM COMPOUND AS COMPONENT (C)]

Examples 1 to 5 and Comparative Example 1

In a nitrogen-purged, 100 ml. glass vessel, 0.60 g. of orthophosphoric acid was dissolved in 20 ml. of ethyl ether, and reacted with 4.0 g. of triisobutyl aluminum. Further, 0.2 mol of a thiuram compound shown in Table 1 was added per mol of triisobutyl aluminum, and reacted with the reaction product, and was aged at 30° C. for one hour to prepare a catalyst.

The inside of a 100 ml. glass ampoule was purged with nitrogen, and charged with 15 g. of epichlorohydrin, 35 g. of benzene, and the catalyst prepared above in an amount of 0.1 g. as triisobutyl aluminum. Polymerization was started. The reaction was performed at 60° C. for 3 hours, and then the reaction product obtained was poured into hexane. The solvent and the unreacted monomer were separated, and the resultant polymer was dried at reduced pressure for one day at 50° C. The yield and the reduced specific viscosity of the resultant polymer are shown in Table 1.

For comparison, the above procedure was repeated except that the polymerization was performed using a catalyst obtained by reacting triisobutyl aluminum and orthophosphoric acid of the same proportions as above. (Comparative Example 1). The results are shown in Table 1.

TABLE 1

| Examples | Thiuram compounds | Yield, percent | Reduced specific viscosity ($\eta$ sp./c.) |
|---|---|---|---|
| 1 | Tetramethyl thiuram disulfide | 97.0 | 5.83 |
| 2 | Tetraethylthiuram disulfide | 89.6 | 5.12 |
| 3 | Dipentamethylenethiuram tetrasulfide | 92.5 | 5.33 |
| 4 | Dimethyldiphenylthiuram tetrasulfide | 91.3 | 5.30 |
| 5 | Diethyldiphenylthiuram disulfide | 95.0 | 5.01 |
| Comparative Example 1 | None | 27.6 | 2.58 |

Examples 6 and 7 and Comparative Example 2

Copolymerization of epichlorohydrin and ethylene oxide was performed using the catalyst prepared in Example 1 (Example 6) and Example 2 (Example 7), respectively. Specifically, 12.5 g. of epichlorohydrin, 1.5 g. of ethylene oxide, 34 g. of benzene, and the catalyst of an amount of 0.1 g. as triisobutyl aluminum were put into a glass vessel, and the polymerization was performed at 60° C. for 3 hours in the same way as in Example 1. The yield and reduced specific viscosity of the resulting copolymer are shown in Table 2.

For comparison, the copolymerization was performed in the same way except using the catalyst used in Comparative Example 2.

TABLE 2

| Examples | Catalysts | Yield, percent | Reduced specific viscosity ($\eta$ sp./c.) |
|---|---|---|---|
| 6 | Catalyst used in Example 1 | 86.1 | 4.51 |
| 7 | Catalyst used in Example 2 | 72.3 | 4.12 |
| Comparative Example 2 | Catalyst used in Comparative Example 1 | 8.2 | 0.98 |

Examples 8 to 10 and Comparative Examples 3 to 5

In the same way as in Example 1, 0.60 g. of orthophosphoric acid was dispersed in 20 ml. of ethyl ether, and reacted with an organoaluminum compound shown in Table 3. The reaction product was then further reacted with 0.1 mol, per mol of the organoaluminum, of a thiuram compound shown in Table 3, and was aged at 60° C. for 30 minutes.

In the same way as in Example 1, 15 g. of epichlorohydrin, 35 g. of toluene, and the catalyst prepared above of an amount of 0.05 g. as the organoaluminum compound were put into a reactor, and the polymerization was performed. The yield and reduced specific viscosity of the resulting polymer are shown in Table 3.

For comparison, the polymerization was performed without using the thiuram compound (Comparative Examples 3 to 5). The results are also shown in Table 3.

TABLE 3

| Examples | Organoaluminum compounds (amt. in g.) | Thiuram compounds | Yield, percent | Reduced specific viscosity ($\eta$ sp./c.) |
|---|---|---|---|---|
| 8 | Tri-n-propyl aluminum (3.2 g.) | Tetramethyl thiuram disulfide | 78.0 | 4.70 |
| Comparative Example 3 | do | None | 19.5 | 2.09 |
| 9 | Tri-i-hexyl aluminum (5.7 g.) | Tetramethyl thiuram disulfide | 100 | 5.50 |
| Comparative Example 4 | do | None | 28.1 | 2.17 |
| 10 | Diethylaluminum chloride (2.5 g.) | Dipentamethylene thiuram tetrasulfide | 51.2 | 3.72 |
| Comparative Example 5 | do | None | 25.3 | 1.85 |

Examples 11 and 12 and Comparative Example 6

The polymerization of propylene oxide was performed using the catalyst prepared in Example 1 (Example 11) and Example 2 (Example 12). Specifically, a 100 ml. glass ampoule was purged internally with nitrogen, and then charged with 15 g. of propylene oxide, 35 g. of benzene, and the catalyst of an amount of 0.1 g. as triisobutyl alumnum. The polymerization was performed for 3 hours at 60° C. After termination of the polymerization, the unreacted monomer and solvent were removed by the lyophilizing method to obtain a white rubbery polymer. The yield and reduced specific viscosity of the polymer are shown in Table 4.

For comparison, the above procedure was repeated using the catalyst used in Comparative Example 1 (Comparative Example 6).

TABLE 4

| Examples | Catalysts | Yields, percent | Reduced specific viscosity ($\eta$ sp./c.) |
|---|---|---|---|
| 11 | Catalyst used in Example 1 | 52.7 | 3.14 |
| 12 | Catalyst used in Example 2 | 64.9 | 4.03 |
| Comparative Example 6. | Catalyst used in Comparative Example 1. | 18.0 | 1.65 |

Examples 13 and 14 and Comparative Example 7

In the same way as in Example 1, 0.9 g. of metaphosphoric acid was dispersed in 20 ml. of ethyl ether, and reacted with 4.0 g. of triisobutyl aluminum. The reaction product was further reacted with 0.1 mol, per mol of the triisobutyl aluminum, of a thiuram compound shown in Table 5, and was aged at 30° C. for one hour to form a catalyst.

In the same way as in Example 1, 15 g. of epichlorohydrin was polymerized at 60° C. for 2 hours in 35 g. of toluene using the catalyst prepared above of an amount of 0.1 g. as triisobutyl aluminum. The yield and reduced specific viscosity of the polymer obtained are shown in Table 5.

For comparison, the above procedure was repeated except that the thiuram compound was not used (Comparative Example 7).

TABLE 5

| Examples | Thiuram compounds | Yield, percent | Reduced specific viscosity ($\eta$ sp./c.) |
|---|---|---|---|
| 13 | Tetramethylthiuram disulfide | 29.8 | 2.86 |
| 14 | Dipentamethylene thiuram tetrasulfide. | 35.2 | 3.12 |
| Comparative Example 7. | None | 11.5 | 1.96 |

[USE OF BENZOTHIAZYL SULFENAMIDE AS COMPONENT (C)]

Examples 15 to 17 and Comparative Example 8

In a nitrogen-purged, 100 ml. glass vessel, 0.6 g. of orthophosphoric acid was dispersed in 20 ml. of ethyl ether, and reacted with 4.0 g. of triisobutyl aluminum. The reaction product was further reacted with 0.2 mol, per mol of triisobutyl aluminum, of a benzothiazyl sulfenamide indicated in Table 6, and was aged at 30° C. for one hour to form a catalyst.

The inside of a 100 ml. glass ampoule was purged with nitrogen, and charged with 14.2 g. of epichlorohydrin and 33.1 g. of toluene, and 0.1 g., as triisobutyl aluminum, of the catalyst prepared above. Polymerization was started, and the reaction was continued for 3 hours at 60° C. Then, the reaction product was poured into hexane, and the solvent and unreacted monomer were separated. The polymer was then dried at reduced pressure at 50° C. for one day. The yield and reduced specific viscosity of the resultant polymer are shown in Table 6.

For comparison, the procedure of Example 15 was repeated except using the reaction product of only triisobutyl aluminum and orthophosphoric acid of the same proportion as in Example 15 as catalyst (Comparative Example 8). The results are also shown in Table 6.

TABLE 6

| Examples | Sulfenamides | Yield, percent | Reduced specific viscosity ($\eta$ sp./c.) |
|---|---|---|---|
| 15 | N-cyclohexylbenzothiazyl sulfenamide. | 94.2 | 5.32 |
| 16 | N-oxydiethylene benzothiazyl-2-sulfenamide. | 86.7 | 4.17 |
| 17 | N,N-dicyclohexylbenzothiazyl sulfenamide. | 100 | 6.24 |
| Comparative Example 8. | None | 46.9 | 2.80 |

Examples 18 to 20 and Comparative Example 9

The inside of a 100 ml. glass ampoule was purged with nitrogen, and charged with 14 g. of a solution obtained by mixing 1 mol of epichlorohydrin with 0.22 mol of ethylene oxide, 33 g. of toluene, and 0.1 g., as triisobutyl aluminum, of the catalyst prepared in Example 15. The copolymerization of epichlorohydrin with ethylene oxide was performed in the same way as set forth in Example 15. The yield and reduced specific viscosity of the polymer are shown in Table 7.

For comparison, the above procedure was repeated using the catalyst used in Comparative Example 8 (Comparative Example 9). The results are also shown in Table 7.

TABLE 7

| Examples | Sulfenamides | Yield, percent | Reduced specific viscosity ($\eta$ sp./c.) |
|---|---|---|---|
| 18 | N-cyclohexylbenzothiazyl sulfenamide. | 34.9 | 3.17 |
| 19 | N-oxydiethylenebenzothiazyl-2-sulfenamide. | 21.2 | 2.84 |
| 20 | N,N-dicyclohexylbenzothiazyl sulfenamide. | 98.3 | 5.33 |
| Comparative Example 9. | None | 9.41 | 0.98 |

Example 21 and Comparative Example 10

The inside of a 100 ml. glass ampoule was purged with nitrogen, and charged with 13.1 g. of propylene oxide, 30.6 g. of benzene, and 0.1 g., as triisobutyl aluminum, of the catalyst prepared in Example 15. Polymerization was started, and the reaction was continued for 3 hours at 60° C. The resultant reaction product was lyophilized, and then dried at reduced pressure and room temperature for one day to form a polymer. The yield and reduced specific viscosity of the polymer are shown in Table 8.

For comparison, the above procedure was repeated using the catalyst used in Comparative Example 8 (Comparative Example 10). The results are also shown in Table 8.

TABLE 8

| Examples | Sulfenamides | Yield, percent | Reduced specific viscosity ($\eta$ sp./c.) |
|---|---|---|---|
| 21 | N,N-dicyclohexylbenzothiazyl sulfenamide. | 63.7 | 3.15 |
| Comparative Example 10. | None | 23.1 | 1.74 |

Example 22

In a 100 ml. glass vessel whose inside had been purged with nitrogen, 0.6 g. of orthophosphoric acid was dispersed in 20 ml. of ethyl ether, and reacted with 2.4 g. of diethylaluminum chloride. The reaction product obtained was further reacted with 0.2 mol, per mol of diethylaluminum chloride, of N,N-dicyclohexylbenzothiazyl sulfenamide and was aged at 30° C. for one hour to form a catalyst.

The polymerization of epichlorohydrin was performed in the same way as in Example 15 using the catalyst in an amount of 0.06 g. as diethylaluminum chloride. The yield of the polymer was 64.6%, and the reduced specific viscosity thereof was 3.18.

When the above procedure was repeated using as a catalyst the reaction product obtained by reacting diethylaluminum chloride and orthophosphoric acid in the same proportions as in Example 22, a polymer was obtained in a yield of 32.5%, which had a reduced specific viscosity of 2.10.

Examples 23 and 24 and Comparative Example 11

In the same way as in Example 15, 0.9 g. of polyphosphoric acid (molecular formula $H_6P_4O_{13}$) was dispersed in 20 ml. of ethyl ether, and reacted with 4.0 g. of triisobutyl aluminum. The reaction product was further reacted with 0.1 mol, per mol of the triisobutyl aluminum, of a benzothiazyl sulfenamide indicated in Table 9, and was aged at 60° C. for 3 minutes to prepare a catalyst.

In the same way as in Example 15, 14.2 g. of epichlorohydrin was polymerized in 33.1 g. of toluene using 0.1 g. as triisobutyl aluminum of the above catalyst at 60° C. for 3 hours. The yield and reduced specific viscosity of the resultant polymer are shown in Table 9.

For comparison, the above procedure was repeated using as a catalyst the reaction product of triisobutyl aluminum and polyphosphoric acid (Comparative Example 11). The results are also shown in Table 9.

TABLE 9

| Examples | Sulfenamides | Yield, percent | Reduced specific viscosity ($\eta$ sp./c.) |
|---|---|---|---|
| 23 | N,N-dicyclohexylbenzothiazyl sulfenamide. | 73.9 | 6.18 |
| 24 | N,N'-diisopropyl-2-benzothiazyl sulfenamide. | 62.3 | 6.04 |
| Comparative Example 11. | None | 21.5 | 3.30 |

Example 25

Using the same catalyst as that used in Example 17, the copolymerization of epichlorohydrin with allyl glycidyl ether was performed. In a nitrogen-purged, 100 ml. glass vessel, 13 g. of epichlorohydrin, 2.5 g. of allyl glycidyl ether, 35 g. of toluene, and 0.2 g., as triisobutyl aluminum, of the catalyst were placed, and the polymerization was performed at 60° C. for 2 hours. After termination of the reaction, the reaction product was treated in the same way as in Example 15 to produce a polymer having a reduced specific viscosity of 3.81 in a yield of 89.3%. The polymer had a chlorine content of 31.2% by weight.

When the above procedure was repeated using the catalyst used in Comparative Example 8 in Table 6, a polymer having a reduced specific viscosity of 1.97 was obtained in a yield of 22.5%.

Example 26

Epichlorohydrin was polymerized in the same way as in Example 15 except that 0.9 g. of metaphosphoric acid was used instead of 0.6 g. of orthophosphoric acid. The yield of the resulting polymer was 31.3%, and it had a reduced specific viscosity of 3.08.

When the above procedure was repeated in the absence of the sulfenamide, a polymer having a reduced specific viscosity of 2.18 was obtained in a yield of 12.8%.

[USE OF DITHIOCARBAMATE OR XANTHATE AS COMPONENT (C)]

Examples 27 to 38 and Comparative Example 12

In a nitrogen-purged, 100 ml. glass vessel, 0.6 g. of orthophosphoric acid was dispersed in 20 ml. of ethyl ether, and reacted with 4.0 g. of triisobutyl aluminum. The reaction product was further reacted with 0.2 mol, per mol of triisobutyl aluminum, of a compound indicated in Table 10, and was aged at 30° C. for one hour to form a catalyst.

The inside of a 100 ml. glass ampoule was purged with nitrogen, and charged with 14.2 g. of epichlorohydrin, 33.1 g. of toluene, and 0.1 g., as triisobutyl aluminum, of the above catalyst. Polymerization was started, and the reaction was continued at 60° C. for 3 hours. The reaction product was poured into hexane, and the solvent and unreacted monomer were separated. The product was further dried at reduced pressure at 50° C. for one day. The yield and reduced specific viscosity of the resulting polymer are shown in Table 10.

For comparison, the above procedure was repeated using a catalyst obtained by reacting only tributyl aluminum and orthophosphoric acid of the same-proportions as in Example 27 (Compartive Example 12). The results are also shown in Table 10.

TABLE 10

| Examples | Dithiocarbamates | Yield, percent | Reduced specific viscosity ($\eta$ sp./c.) |
|---|---|---|---|
| 27 | Zinc diethyldithiocarbamate | 84.6 | 4.32 |
| 28 | Zinc ethylphenyldithiocarbamate. | 87.4 | 4.21 |
| 29 | Selenium diethyldithiocarbamate. | 96.4 | 5.68 |
| 30 | Copper dimethyldithiocarbamate. | 64.8 | 4.33 |
| 31 | Piperidine pentamethylene dithiocarbamate. | 94.5 | 6.15 |
| 32 | Pipecolinepipecolyl dithiocarbamate. | 88.6 | 5.73 |
| 33 | Cadmium dimethyldithiocarbamate. | 86.2 | 4.10 |
| 34 | Nickel dibutyldithiocarbamate | 73.9 | 4.02 |
| 35 | Iron dimethyldithiocarbamate | 81.5 | 4.31 |
| 36 | Bismuth dimethyldithiocarbamate. | 75.5 | 4.20 |
| 37 | Tellurium diethyldithiocarbamate. | 78.3 | 4.15 |
| 38 | Zinc butylxanthogenate | 65.5 | 3.85 |
| Comparative Example 12. | None | 46.9 | 2.80 |

Examples 39 to 44 and Comparative Example 13

The inside of a 100 ml. glass ampoule was purged with nitrogen, and charged with 14 g. of a solution obtained by mixing 1 mol of epichlorohydrin with 0.22 mol of ethylene oxide, 33 g. of toluene, and 0.1 g., as triisobutyl aluminum, of the catalyst used in Examples 27 to 32 respectively. The copolymerization of epichlorohydrin with ethylene oxide was performed in the same was as in Example 27. The yield and reduced specific viscosity of the resulting polymer are shown in Table 11.

For comparison, the above procedure was repeated using the catalyst used in Comparative Example 12 (Comparative Example 13). The results are also shown in Table 12.

TABLE 12

| Examples | Dithiocarbamates | Yield, percent | Reduced specific viscosity ($\eta$ sp./c.) |
|---|---|---|---|
| 39 | Zinc diethyldithiocarbamate | 20.3 | 2.53 |
| 40 | Zinc ethylphenyldithiocarbamate. | 22.7 | 3.17 |
| 41 | Selenium diethyldithiocarbamate. | 14.0 | 2.14 |
| 42 | Copper dimethyldithiocarbamate. | 20.9 | 3.05 |
| 43 | Piperidine pentamethylene dithiocarbamate. | 92.4 | 4.83 |
| 44 | Pipecoline pipecolyl dithiocarbamate. | 62.1 | 4.09 |
| Comparative Example 13. | None | 9.41 | 0.98 |

Examples 45 to 46 and Comparative Example 14

The inside of a 100 ml. glass ampoule was purged with nitrogen, and charged with 13.1 g. of propylene oxide, 30.6 g. of benzene, and 0.1 g., as triisobutyl aluminum, of the catalysts used in Examples 31 and 32 respectively. Polymerization was started, and the reaction was continued at 60° C. for 3 hours. The resulting reaction product was lyophilized, and dried at reduced pressure at room temperature for one day to form a polymer. The yield and reduced specific viscosity of the resulting polymer are shown in Table 12.

For comparison, the above procedure was repeated using the catalyst used in Comparative Example 12 (Comparative Example 14). The results are also shown in Table 12.

TABLE 12

| Examples | Dithiocarbamates | Yield, percent | Reduced specific viscosity ($\eta$ sp./c.) |
| --- | --- | --- | --- |
| 45 | Piperidinepentamethylene dithiocarbamate. | 71.2 | 3.38 |
| 46 | Pipecolinepipecolyl dithiocarbamate. | 59.9 | 3.15 |
| Comparative Example 14. | None | 23.1 | 1.74 |

Examples 47 to 50 and Comparative Examples 15 to 17

In the same way as set forth in Example 27, 0.6 g. of orthophosphoric acid was dispersed in 20 ml. of ethyl ether, and reacted with an organoaluminum compound indicated in Table 13. The reaction product was further reacted with 0.2 mol, per mol of the organoaluminum comopund, of a dithiocarbamate indicated in Table 13, and was aged at 60° C. for 30 minutes to prepare a catalyst.

In the same way as in Example 27, 14.2 g. of epichlorohydrin was polymerized in 33.1 g. of toluene at 60° C. for 3 hours using the above catalyst of an amount of 0.1 g. as the organoaluminum compound. The yield and reduced specific viscosity of the resulting polymer are shown in Table 13.

For comparison, the above procedure was repeated using only the organoaluminum compound and orthophosphoric acid as a catalyst (Comparative Examples 15 to 17). The results are also shown in Table 13.

TABLE 13

| Examples | Organoaluminum compound | Dithiocarbamate | Yield, percent | Reduced specific viscosity ($\eta$ sp./c.) |
| --- | --- | --- | --- | --- |
| 47 | Tri-n-propylaluminum. | Zinc diethyldithiocarbamate. | 85.3 | 4.18 |
| 48 | ___do___ | Piperidine pentamethylene dithiocarbamate. | 91.2 | 4.22 |
| Comparative Example 15. | ___do___ | None | 31.5 | 2.30 |
| 49 | Tri-n-hexylaluminum. | Pipecolinepipecolyl dithiocarbamate. | 92.8 | 4.51 |
| Comparative Example 16. | ___do___ | None | 33.1 | 2.57 |
| 50 | Tri-n-hexyl aluminum. | Cadmium dimethyl dithiocarbamate. | 95.3 | 4.69 |
| Comparative Example 17. | ___do___ | None | 37.1 | 2.60 |

[USE OF BENZOTHIAZOLE OR BENZIMIDAZOLE SALT AS COMPONENT (C)]

Examples 51 to 54 and Comparative Example 18

In a nitrogen-purged, 100 ml. glass vessel, 0.6 g. of orthophosphoric acid was dispersed in 20 ml. of ethyl ether, and reacted with 4.0 g. of triisobutyl aluminum. The reaction produce was further reacted with 0.2 mol, per mol of the triisobutyl aluminum, of a benzothiazole indicated in Table 14, and was aged at 30° C. for one hour to form a catalyst.

The inside of a 100 ml. glass ampoule was purged with nitrogen, and charged with 14.2 g. of epichlorohydrin, 33.1 g. of toluene, and the above catalyst of an amount of 0.1 g. as triisobutyl aluminum. Polymerization was started, and the reaction was continued at 60° C. for 3 hours. The reaction product was poured into hexane, and the solvent and unreacted monomer were separated. The product was further dried at reduced pressure at 50° C. for one day. The yield and reduced specific viscosity of the resulting polymer are shown in Table 14.

For comparison, the above procedure was repeated using as a catalyst the reaction product obtained by reacting isobutyl aluminum and orthophosphoric acid of the same proportions as shown in Example 51 (Comparative Example 18). The results are also shown in Table 14.

TABLE 14

| Examples | Benzothiazoles | Yield, percent | Reduced specific viscosity ($\eta$ sp./c.) |
| --- | --- | --- | --- |
| 51 | 2-mercaptobenzothiazole zincs alt. | 66.3 | 3.92 |
| 52 | 2-mercaptobenzothiazole cyclohexylamine salt. | 81.2 | 4.01 |
| 53 | 2-(4-morpholinyl dithio)benzothiazole. | 75.1 | 3.85 |
| 54 | 2-benzothiazyl-N,N-diethyl thiocarbamoyl sulfide. | 88.4 | 4.37 |
| Comparative Example 18. | None | 46.9 | 2.80 |

Examples 55 and 56 and Comparative Example 19

The inside of a 100 ml. glass ampoule was purged with nitrogen, and charged with 14 g. of a solution obtained by mixing 1 mol of epichlorohydrin and 0.22 mol of ethylene oxide, 33 g. of toluene, and 0.1 g., as triisobutyl aluminum, of the same catalyst as used in Example 51. The copolymerization of epichlorohydrin with ethylene oxide was performed in the same way as set forth in Example 51. The yield and reduced specific viscosity of the polymer obtained are shown in Table 15.

For comparison, the above procedure was repeated using the same catalyst as used in Comparative Example 18 (Comparative Example 19). The results are also shown in Table 15.

TABLE 15

| Examples | Benzothiazoles | Yield, percent | Reduced specific viscosity ($\eta$sp./c.) |
| --- | --- | --- | --- |
| 55 | Zinc salt of 2-mercaptobenzothiazole. | 14.1 | 1.85 |
| 56 | Cyclohexylamine salt of 2-mercaptobenzothiazole. | 27.2 | 3.05 |
| Comparative Example 19. | None | 9.4 | 0.98 |

Example 57

Epichlorohydrin was polymerized in the same way as set forth in Example 51 except that a zinc salt of 2-mercaptobenzimidazole was used instead of the zinc salt of 2-mercaptobenzothiazole. A polymer having a reduced specific viscosity of 3.75 was obtained in a yield of 75.3%.

Examples 58 and 59 and Comparative Example 20

The inside of a 50 ml. glass ampoule was purged with nitrogen, and charged with 4.5 g. of cyclopentene oxide, 13.5 g. of benzene, and 0.3 g., as triisobutyl aluminum, of the catalysts used in Examples 51 and 54 respectively. The polymerization was performed at 60° C. for 4 hours. After completion of the reaction, the product was lyophilized to remove the unreacted monomer and the solvent to form a waxy, strongly tacky polymer. The yield and reduced specific viscosity of the resulting polymer are shown in Table 16.

For comparison, the above procedure was repeated using the same catayst as used in Comparative Example 19 (Comparative Example 20). The results are shown also in Table 16.

TABLE 16

| Examples | Catalysts | Yield, percent | Reduced specific viscosity ($\eta$sp./c.) |
| --- | --- | --- | --- |
| 58 | Catalyst used in Example 51 | 61.5 | 0.61 |
| 59 | Catalyst used in Example 54 | 78.2 | 0.68 |
| Comparative Example 20. | Catalyst used in Comparative Example 19. | 34.1 | 0.30 |

Example 60

Epichlorohydrin was polymerized in the same way as set forth in Example 54 except that polyphosphoric acid ($H_6P_4O_{13}$) was used instead of orthophosphoric acid. A polymer having a reduced specific viscosity of 4.82 was obtained in a yield of 79.2%.

Examples 61 and 62 and Comparative Example 21

The copolymerization of epichlorohydrin with allyl glycidyl ether was performed using the catalysts of Examples 51 and 53 respectively. Specifically, in the same manner as set forth in Example 51, 13 g. of epichlorohydrin was copolymerized with 2.5 g. of allyl glycidyl ether in 35 g. of toluene at 60° C. for 2 hours using 0.2 g., as triisobutyl aluminum, of the catalyst. The yield and reduced specific viscosity of the resulting polymer are shown in Table 17.

For comparison, the above procedure was repeated using the same catalyst as used in Comparative Example 19 (Comparative Example 21). The results are also given in Table 17.

TABLE 17

| Examples | Catalysts | Yield, percent | Reduced specific viscosity ($\eta$sp./c.) | Chlorine content, percent |
|---|---|---|---|---|
| 61 | Same catalyst as used in Example 51 | 75.3 | 3.81 | 32.5 |
| 62 | Same catalyst as used in Example 53 | 91.6 | 3.92 | 31.0 |
| Comparative Example 21 | Same catalyst as used in Comparative Example 19. | 23.8 | 2.15 | 33.1 |

What we claim is:

1. A catalyst comprising the reaction product of
   (A) an organoaluminum compound having the general formula $$AlR_nX_{3-n}$$

wherein R is an alkyl, alkenyl, cycloalkyl, aryl or aralkyl group, X is a hydrogen, fluorine, chlorine, bromine or iodine atom, and $n$ is an integer of 1 to 3;
   (B) an inorganic phosphorus compound, said compound being an inorganic phosphorus acid having at least one P—OH bond; and
   (C) a compound selected from the group consisting of
      (1) an alkyl, aryl, or alkyl and aryl substituted thiuram mono-, di- or tetra-sulfide;
      (2) a benzothiazyl sulfenamide compound having the general formula

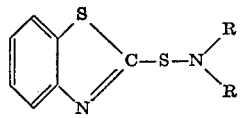

wherein R is a hydrogen atom, a hydrocarbyl group or an oxyhydrocarbyl group, and wherein the two R substituents amy combine to form a ring;
      (3) an amine derivative of, a metal salt of, or a dinitrophenyl ester of dithiocarbamic acid, said metal salt being selected from the group consisting of the zinc, cadmium, copper, nickel, cobalt, manganese, iron, lead, tellurium, selenium, and bismuth salts;
      (4) a zinc alkyl xanthogenate; and
      (5) an amine derivative of, a copper salt of, or a zinc salt of 2-mercapto benzothiazole, an amine derivative of, a copper derivative of, or a zinc derivative of 2-mercapto-benzimidazole, nitrophenyl-2-mercaptobenzothiazole or nitrophenyl-2-mercapto benzimidazole.

2. A catalyst of claim 1, wherein the proportions of compound (B) and compound (C) are 0.01 to 10 mols, and 0.001 to 10 mols respectively per mol of compound (A).

3. A catalyst of claim 1, wherein said organoaluminum compound (A) is selected from the group consisting of triethyl aluminum, triisobutyl aluminum, tri-n-hexyl aluminum, dimethyl aluminum bromide, diethyl aluminum chloride, ethyl aluminum dichloride, diphenyl aluminum chloride, and ethyl aluminum sesquichloride.

4. A catalyst of claim 1, wherein said compound (B) is selected from the group consisting of orthophosphoric acid, phosphorous acid, diphosphorous acid, hypophosphorous acid, hypophosphoric acid, polyphosphoric acids, and metaphosphoric acid.

5. A catalyst of claim 1, wherein said thiuram sulfide (C) is selected from the group consisting of tetramethylthiuram monosulfide, tetramethylthiuram disulfide, tetraethylthiuram disulfide, tetrabutylthiuram disulfide, dimethyldiphenylthiuram tetrasulfide, tetramethylthiuram tetrasulfide, and dipentamethylenethiuram tetrasulfide.

6. A catalyst of claim 1, wherein said benzothiazyl sulfenamide (C) is selected from the group consisting of N,N-diethyl-2-benzothiazyl sulfenamide, N-cyclohexylbenzothiazyl sulfenamide, N-oxydiethylenebenzothiazyl-2-sulfenamide, N-tert.-butyl-2-benzothiazyl sulfenamide, N,N-diisopropyl-2-benzothiazyl sulfenamide, and N,N-dicyclohexylbenzothiazyl sulfenamide.

7. A catalyst of claim 1, wherein said dithiocarbamic acid amine derivative (C) is the piperidine or pipecoline derivative.

8. A catalyst of claim 1, wherein said dithiocarbamic acid (C) is selected from the group consisting of zinc dimethyl dithiocarbamate, zinc ethylphenyl dithiocarbamate, cadmium diethyldithiocarbamate, zinc dibutyl dithiocarbamate, selenium diethyldithiocarbamate, nickel dimethyldithiocarbamate, nickel dibutyldithiocarbamate, iron dimethyldithiocarbamate, cobalt dimethyldithiocarbamate, bismuth dimethyldithiocarbamate, tellurium diethyldithiocarbamate, copper dimethyldithiocarbamate, piperidine pentamethylenedithiocarbamate, and pipecoline pentamethylenedithiocarbamate.

9. A catalyst of claim 1, wherein said zinc alkyl xanthogenate (C) is selected from the group consisting of zinc butylxanthogenate and zinc isopropylxanthogenate.

10. A catalyst of claim 1, wherein said benzothiazole salt (C) is selected from the group consisting of a zinc salt of 2-mercaptobenzothiazole, a copper salt of 2-mercaptobenzothiazole, a cyclohexylamine salt of 2-mercaptobenzothiazole, 2-(4-morpholinyldithio)benzothiazole, 2-benzothiazyl-N,N-diethylthiocarbamoyl sulfide, and 2-(2,6-dimethyl-4-morpholinothio)benzothiazole.

11. A catalyst of claim 1, wherein said benzimidazole salt (C) is selected from the group consisting of a zinc salt of 2-mercaptobenzimidazole and a copper salt of 2-mercaptobenzimidazole.

12. A catalyst comprising a reaction product of triisobutyl aluminum, orthophosphoric acid, and N,N-dicyclohexylbenzothiazyl sulfenamide.

13. A process for producing a catalyst, which comprises reacting
   (A) an organoaluminum compound having the general formula $$AlR_nX_{3-n}$$

wherein R is an alkyl, alkenyl, cycloalkyl, aryl or aralkyl group, X is a hydrogen, fluorine, chlorine, bromine or iodine atom, and $n$ is an integer of 1 to 3;
   (B) an inorganic phosphorus compound, said compound being an inorganic phosphorus acid having at least one P—OH bond; and
   (C) a compound selected from the group consisting of
      (1) an alkyl, aryl, or alkyl and aryl substituted thiuram mono-, di- or tetra-sulfide;

(2) a benzothiazyl sulfenamide compound having the general formula

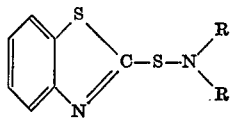

wherein R is a hydrogen atom, a hydrocarbyl group or an oxyhydrocarbyl group, and wherein the two R substitutents may combine to form a ring;

(3) an amine derivative of, a metal salt of, or a dinitrophenyl ester or dithiocarbamic acid, said metal salt being selected from the group consisting of the zinc, cadmium, copper, nickel, cobalt, manganese, iron, lead, tellurium, selenium, and bismuth salts;

(4) a zinc alkyl xanthogenate; and (5) an amine derivative of, a copper salt of, or a zinc salt of 2-mercapto benzothiazole, an amine derivative of, a copper derivative of, or a zinc derivative of 2-mercapto-benzimidazole, nitrophenyl-2-mercaptobenzothiazole or nitrophenyl-2-mercapto benzimidazole;

in an inert solvent.

14. A process of claim 13, wherein the reaction product is aged at 30 to 100° C. for 10 minutes to 3 hours.

15. A process for polymerizing an epoxy compound, which comprises polymerizing or copolymerizing an epoxy compound which is a monooxirane compound in the presence of a catalyst comprising the reaction product of (A) an organoaluminum compound having the general formula $$AlR_nX_{3-n}$$

wherein R is an alkyl, alkenyl, cycloalkyl, aryl or aralkyl group, X is a hydrogen, fluorine, chlorine, bromine or iodine atom, and n is an integer of 1 to 3;

(B) an inorganic phosphorus compound, said compound being an inorganic phosphorus acid having at least one P—H bond; and (C) a compound selected from the group consisting of (1) an alkyl, aryl, or alkyl and aryl substituted thiuram mono-, di- or tetra-sulfide;

(2) a benzothiazyl sulfenamide compound having the general formula

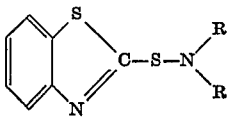

wherein R is a hydrogen atom, a hydrocarbyl group or an oxyhydrocarbyl group, and wherein the two R substitutents may combine to form a ring;

(3) an amine derivative of, a metal salt of, or a dinitrophenyl ester of dithiocarbamic acid, said metal salt being selected from the group consisting of the zinc, cadmium, copper, nickel, cobalt, manganese, iron, lead, tellurium, selenium, and bismuth salts;

(4) a zinc alkyl xanthogenate; and (5) an amine derivative of, a copper salt of, or a zinc salt of 2-mercapto benzothiazole, an amine derivative of, a copper derivative of, or a zinc derivative of 2-mercapto-benzimidazole, nitrophenyl-2-mercaptobenzothiazole or nitrophenyl-2-mercapto benzimidazole.

16. A process of claim 15 wherein said epoxy compound is at least one member selected from the group consisting of ethylene oxide, propylene oxide, butene oxide, isobutylene epoxide, butadiene monoxide, epichlorohydrin, epibromohydrin, methacryl chloride epoxide, trifluoromethylethylene oxide, dichloroisobutylene oxide, cyclohexene oxide, vinylcyclohexene oxide, allyl glycidyl ether, phenyl glycidyl ether, chloroethyl glycidyl ether, glycidyl acrylate, styrene oxide, and epoxy stearate.

17. A process of claim 15 wherein the amount of the catalyst is 0.1 to 10 parts by weight per 100 parts by weight of the epoxy compound.

18. A process of claim 15 wherein the polymerization reaction is performed at a temperature of from 0° C. to 100° C. without a solvent or in a solvent selected from the group consisting of ethers, aromatic hydrocarbons, saturated aliphatic hydrocarbons, and halogenated hydrocarbons.

19. A process of claim 15 wherein the catalyst is a reaction product in a proportion of 1 mol of compound (A), 0.01 to 10 mols of compound (B), and 0.001 to 10 mols of compound (C).

20. A process of claim 15 wherein said organoaluminum compound (A) is selected from the group consisting of triethyl aluminum, triisobutyl aluminum, tri-n-hexyl aluminum, dimethyl aluminum bromide, diethyl aluminum chloride, ethyl aluminum dichloride, diphenyl aluminum chloride, and ethyl aluminum sesquichloride.

21. A process of claim 15 wherein said compound (B) is selected from the group consisting of orthophosphoric acid, phosphorus acid, diphosphorous acid, hypophosphorous acid, hypophosphoric acid, polyphosphoric acids. and metaphosphoric acid.

22. A process of claim 15 wherein said thiuram sulfide (C) is selected from the group consisting of tetramethylthiuram monosulfide, tetramethylthiuram disulfide, tetraethylthiuram disulfide, tetrabutylthiuram disulfide, dimethyldiphenylthiuram tetrasulfide, tetramethylthiuram tetrasulfide, and dipentamethylenethiuram tetrasulfide.

23. A process of claim 15 wherein said benzothiazyl sulfenamide (C) is selected from the group consisting of N,N-diethyl-2-benzothiazyl sulfenamide, N-cyclohexylbenzothiazyl sulfenamide, N-oxydiethylenebenzothiazyl-2-sulfenamide, N-tert.-butyl-2-benzothiazyl sulfenamide, N,N-diisopropyl-2-benzothiazyl sulfenamide, and N,N-dicyclohexylbenzothiazyl sulfenamide.

24. A process of claim 15 wherein said dithiocarbamic acid salt (C) is selected from the group consisting of zinc dimethyl dithiocarbamate, zinc ethylphenyl dithiocarbamate, cadmium diethyldithiocarbamate, zinc dibutyl dithiocarbamate, selenium diethyldithiocarbamate, nickel dimethyl dithiocarbamate, nickeldibutyldithiocarbamate, iron dimethyldithiocarbamate, cobalt dimethyldithiocarbamate, manganese diethyldithiocarbamate, bismuth dimethyldithiocarbamate, tellurium diethyldithiocarbamate, copper dimethyldithiocarbamate, piperidine pentamethylenedithiocarbamate, pipecoline pentamethylenedithiocarbamate, and 2,4-dinitrophenyl-dimethyldithiocarbamate.

25. A process of claim 15 wherein said zinc alkyl xanthogenate (C) is selected from the group consisting of zinc butylxanthogenate and zinc isopropylxanthogenate.

26. A process of claim 15 wherein said benzothiazole salt (C) is selected from the group consisting of a zinc salt of 2-mercaptobenzothiazole, a copper salt of 2-mercaptobenzothiazole, a cyclohexylamine salt of 2-mercaptobenzothiazole, 2-(4-morpholinyldithio) benzothiazole, 2-benzothiazyl-N,N-diethylthiocarbamoyl sulfide, 2-(2,6-dimethyl-4-morpholinothio) benzothiazole.

27. A process of claim 15 wherein said benzoimidazole salt (C) is selected from the group consisting of a zinc salt of 2-mercaptobenzimidazole and a copper salt of 2-mercaptobenzimidazole.

28. A catalyst of claim 1 wherein X is a chlorine atom.

29. A process of claim 13 wherein X is a chlorine atom.

30. A process of claim 15, wherein X is a chlorine atom.

References Cited

UNITED STATES PATENTS

| | | | |
|---|---|---|---|
| 3,236,785 | 2/1966 | Naro et al. | 260—2 |
| 3,244,646 | 4/1966 | Naro et al. | 260—2 |
| 3,345,308 | 10/1967 | Lal | 260—2 |
| 3,542,698 | 11/1970 | Lal | 260—2 |
| 3,632,784 | 1/1972 | Lal | 260—2 A |
| 3,671,466 | 6/1972 | Shikata et al. | 260—2 A |
| 3,678,007 | 7/1972 | Dowbenko et al. | 260—47 EN |

WILLIAM H. SHORT, Primary Examiner

E. A. NIELSEN, Assistant Examiner

U.S. Cl. X.R.

252—431 N, 431 P; 260—47 EP, 88.3 A, 615 B